(12) United States Patent
Herrmann et al.

(10) Patent No.: US 10,086,626 B1
(45) Date of Patent: Oct. 2, 2018

(54) REGISTRATION SYSTEM FOR A DIRECT-TO-OBJECT PRINTER

(71) Applicant: Xerox Corporation, Norwalk, CT (US)

(72) Inventors: Douglas K. Herrmann, Webster, NY (US); Jason LeFevre, Penfield, NY (US); Chu-Heng Liu, Penfield, NY (US); Paul McConville, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/477,239

(22) Filed: Apr. 3, 2017

(51) Int. Cl.
| | |
|---|---|
| *B41J 3/407* | (2006.01) |
| *B41M 1/40* | (2006.01) |
| *B41M 5/00* | (2006.01) |
| *B41J 2/045* | (2006.01) |

(52) U.S. Cl.
CPC ......... *B41J 3/4073* (2013.01); *B41J 2/04505* (2013.01); *B41M 1/40* (2013.01); *B41M 5/0088* (2013.01)

(58) Field of Classification Search
CPC ...... B41J 3/4073; B41J 2/04505; B41M 1/40; B41M 5/0088
See application file for complete search history.

(56) References Cited

U.S. PATENT DOCUMENTS

2014/0242285 A1* 8/2014 Pettersson et al. ..... B05B 15/10 427/427.2

OTHER PUBLICATIONS

U.S. Appl. No. 15/163,880, filed May 25, 2016.

* cited by examiner

*Primary Examiner* — Julian Huffman
(74) *Attorney, Agent, or Firm* — Philip E. Blair; Fleit Gibbons Gutman Bongini & Bianco P.L.

(57) ABSTRACT

What is disclosed is a system for registering an object in a direct-to-object print system and a direct-to-object print system configured to operatively use various embodiments of the registration system of the present invention. In one embodiment, the marking system comprises a registration panel with a plurality of registration markings. A camera captures an image of the object in the object holder and the registration panel. A processor receives the image and analyzes the image to determine a position of the object relative to the markings on the registration panel. The processor determines whether the object is registered. If the object is registered, a controller causes the object holder to move the object past the printhead. Otherwise, if the object is not properly registered then the processor prevents the object from being printed and communicates a notification to a user that the object in the object holder is not registered.

33 Claims, 9 Drawing Sheets

US 10,086,626 B1

REGISTRATION SYSTEM FOR A DIRECT-TO-OBJECT PRINTER

TECHNICAL FIELD

The present invention is directed to a printing system for depositing ink directly on to a surface of an object and, more particular, to a system for registering an object held by an object holder in a direct-to-object print system.

BACKGROUND

Printers known in the document reproduction arts apply a marking material, such as ink or toner, onto a sheet of paper. To print something on an object that has a non-negligible depth such as a coffee cup, bottle, and the like, typically a label is printed and the printed label is applied to the surface of the object. However, in some manufacturing and production environments, it is desirable to print directly on the object itself but this poses a diverse set of hurdles which must be overcome before such specialized direct-to-object print systems become more widely accepted in commerce. One such hurdle is how to ensure that the object being held in the object holder is properly registered so that the printhead can print a mark on the object at a predetermined location. The present invention is directed to a system for ensuring that the object in the object holder is properly registered prior to printing.

BRIEF SUMMARY

What is disclosed is a system for registering an object in a direct-to-object print system. In one embodiment, the marking system comprises a registration panel with a plurality of registration markings. A camera captures an image of the object in the object holder and the registration panel. A processor receives the image and analyzes the image to determine a position of the object relative to the markings on the registration panel. The processor determines whether the object is registered. If the object is registered, a controller causes the object holder to move the object past the printhead. Otherwise, if the object is not properly registered then the processor prevents the object from being printed and communicates a notification to a user that the object in the object holder is not registered.

What is also disclosed is a direct-to-object print system configured to operatively use various embodiments of the registration system of the present invention. In one embodiment, the direct-to-object print system incorporates at least one printhead configured to eject marking material such as ink. An object holder configured to slideably traverse a support member positioned to be parallel to a plane formed by the printhead. A registration panel has a plurality of registration markings. At least one camera is positioned to capture an image of both the object in the object holder and the registration panel. A user interface has a display device. An actuator for operatively causing the object holder to move the object along the support member in to proximity of the printhead. A controller configured to cause the printhead to print a mark on the object in the object holder as the object moves past the printhead.

Features and advantages of the above-described registration system and direct-to-object print system will become readily apparent from the following description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a system for registering an object in a direct-to-object print system and a direct-to-object print system configured to operatively use various embodiments of the registration system of the present invention.

Non-Limiting Definitions

An "object" has at least one surface thereof to be printed. Example objects are sports equipment and paraphernalia, golf clubs and golf balls, commemorative gifts, mugs and coffee cups, to name a few.

A "direct-to-object print system" or simply "print system" is a printer designed to print on a surface of an object. The direct-to-object print system of FIG. 1 incorporates at least the following functional components: at least one printhead, a support member, an actuator, a controller, an object holder, a user interface, and at least one camera.

A "printhead" or "print head" is an element (such as an inkjet) which emits or ejects a droplet of marking material such as ink on to a surface of an object thereby making a mark on that object. In one embodiment, the direct-to-object print system has a plurality of monochrome printheads and a UV cure lamp. The print zone is a width of a single M-series printhead (~4 inches). Each printhead is fluidly connected to a supply of marking material (not shown). Some or all of the printheads may be connected to the same supply. Each printhead can be connected to its own supply so each printhead ejects a different marking material. A 10×1 array of printheads is shown at 104 of FIG. 1.

Figure 1:
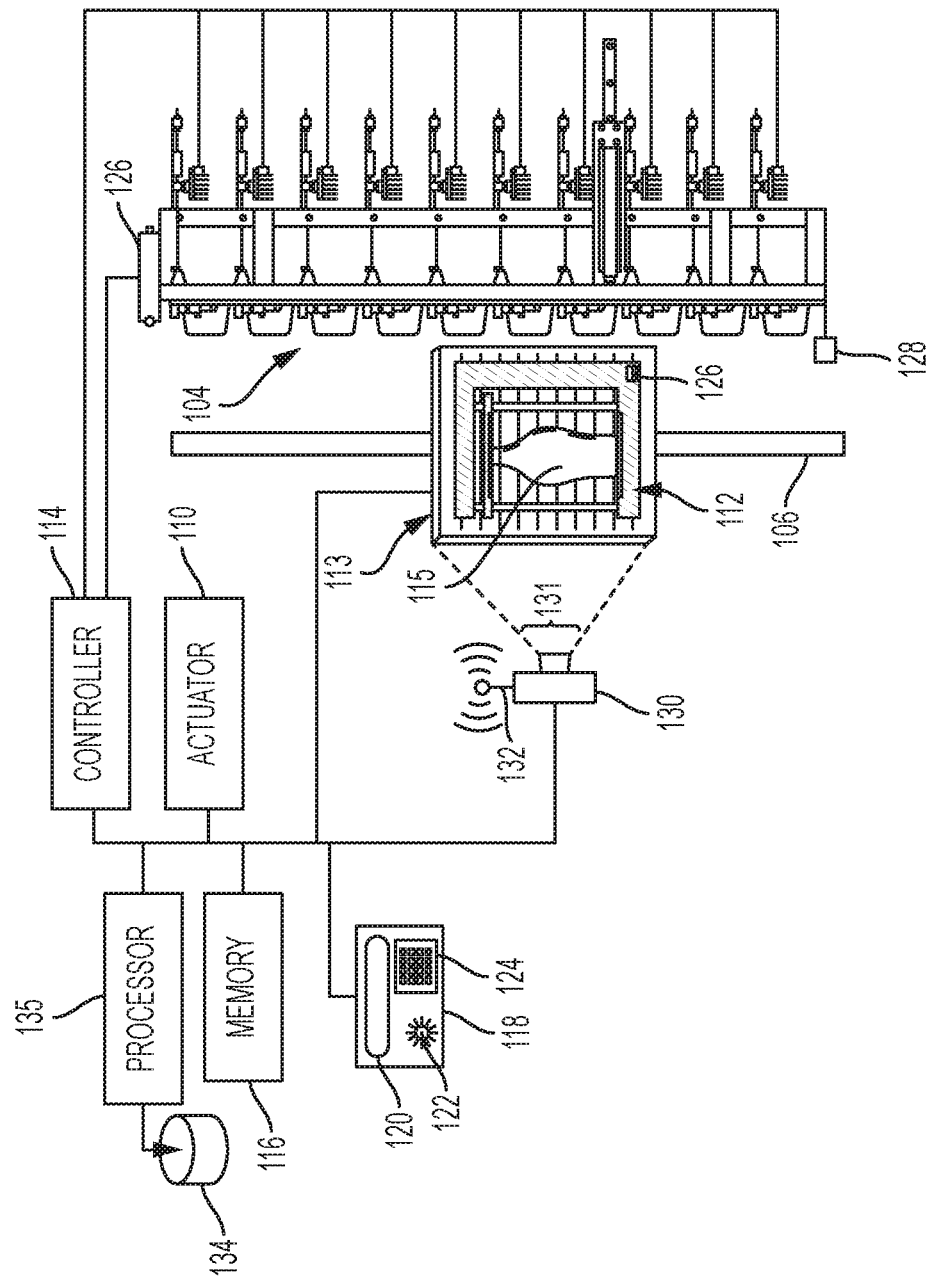
FIG. 1 illustrates one example embodiment of the direct-to-object print system disclosed herein.

A "support member", at 106 of FIG. 1, is positioned to be parallel to a plane formed by the printheads and is oriented so that one end of the support member is at a higher gravitational potential than the other end of the support member. The vertical configuration of the printheads and the support member enables the present direct-to-object print system to have a smaller footprint than a system configured with a horizontal orientation of the printheads and support member. In an alternative embodiment, a horizontal configuration orients the printheads such that the object holder moves an object past the horizontally arranged printheads.

An "actuator", at 110 of FIG. 1, is an electro-mechanical device that causes the object holder to slideably traverse the support member. In one embodiment, a controller causes the actuator to move an object holder at speeds that attenuate the air turbulence in a gap between the printhead and the surface of the object being printed.

An "object holder", at 112 of FIG. 1, physically restrains an object, such as bottle 115, while the object holder is moving along the support member 106 so that the object can pass the printhead. The object holder is configured to slideably traverse the support member.

A "registration panel", at 113, of FIG. 1, has a plurality of registration markings used herein to help determine whether an object placed in the object holder is properly registered for printing. In one embodiment, the registration markings are horizontal or vertical lines uniformly spaced to form a grid, but may take other forms. The registration markings can be non-uniformly spaced or graduated with letters or numbers. The registration panel can be made of a semi-transparent or transparent material such as a clear plastic sheet so that a camera can capture an image of the object through the panel. The panel may be opaque with a camera capturing an image of the object in front of the panel. In one embodiment, the registration panel is part of the camera.

A "controller", at 114 of FIG. 1, is a processor or ASIC which controls various components of the present direct-to-object print system. The controller is also shown in communication with a processor 135. It should be appreciated that processor 135 and controller 114 may be on the same circuit board or within the same chip. The controller is configured to retrieve machine readable program instructions from memory 116 which, when executed, configure the controller to signal or otherwise operate the actuator 110 to move the object holder past the printheads. When other retrieved instructions are executed, the controller is configured to signal, or otherwise operate the printheads to start/stop ejecting marking material at a precise time and at a desired location on a surface of the object retained by the object holder. The controller may be further configured to operate the various printheads such that individual printheads eject different size droplets of marking material. When other instructions are executed, the controller is configured to communicate with a user interface.

A "user interface", at 118 of FIG. 1, generally comprises a display 120 such as a touchscreen, monitor, or LCD device for presenting visual information to a user, an annunciator 122 which emits an audible sound, and an input device 124 such as a keypad for receiving a user input or selection. The controller can be configured to operate the user interface to notify an operator of a failure. The controller monitors the system to detect the configuration of the printheads in the system and the inks being supplied to the printheads. If the inks or the printhead configuration is unable to print the objects accurately and appropriately then a message is presented to the user on the display of the user interface that, for example, inks need to be changed or that the printheads needs to be reconfigured. The controller can be configured to use the annunciator of the user interface to inform the operator of a system status and to attract attention to fault conditions and displayed messages. The user interface may further include a warning light.

An "identification tag", at 126 of FIG. 1, is a machine-readable indicia that is attached to the object holder. The identification tag embodies an identifier that is readable or otherwise receivable by an input device such as sensor 128. The identifier contains information about the object being printed and/or the location of the object as it traverses the support member. The received identifier is, in turn, communicated to the controller. The identification tag can be, for example, a radio frequency identification (RFID) tag with the input device being a RFID reader. The identification tag can also be a barcode with the input device being a barcode reader. In another embodiment, the identification tag comprises one or more protrusions, indentations, or combinations thereof in the object or object holder that can be detected or otherwise read by a biased arm which follows a surface of an area comprising the identification tag. In this embodiment, the biased arm is a cam follower that converts the detected protrusions, indentations, and the like position of the mechanical indicia comprising the identification tag into electrical signals which, in turn, are communicated to the controller for processing. In other embodiments, the identification tag comprises optical or electromagnetic indicia. The controller compares the identifier received from the input device to various identifiers stored in memory 116. The controller can disable operation of the actuator and/or the operation of the printheads in response to the received identifier failing to correspond to an identifier stored in the memory. The controller can also be configured to use the user interface to inform the operator of processing that needs to be performed. For example, an identification tag may indicate that an object in the object holder requires special treatment such as pre-coating prior to printing or post-coating after the object is printed. A location of the identification tag or a failure to detect an identification tag may indicate to the controller that the object held by the object holder is misaligned, has come loose, or is absent altogether. The controller, in these examples, would communicate a message to the display 120 regarding the detected condition(s).

A "sensor", at 128 of FIG. 1, is a device such as a digital camera or other imaging device positioned to generate image data by imaging, for example, a sheet of printed media with a test pattern. The controller is configured to receive the image data from the sensor and analyze the image data to identify printhead alignment, image quality, and other maintenance issues such as inoperative ejectors, low ink supply, or poor ink quality. The controller uses the user interface to notify the operation such that the operator is able to understand the reason why the controller disabled of the direct-to-object print system.

A "camera", at 130 of FIG. 1, as is generally understood, is a device for capturing still images or video of an object in the camera's field of view 131. The images or video of the object may be communicated to a remote device via a wireless communication element 132, shown as an antenna. Example cameras are monochrome cameras for capturing black/white images and color cameras for capturing color images. In other embodiments, the camera is a device with thermal, infrared, multi-spectral or hyperspectral sensors, or a hybrid device comprising any combination hereof. Cameras typically have an output for retrieving the images and may further incorporate other components such as memory and one or more processors. Standard camera equipment and those with specialized imaging sensors are available from vendors in various streams of commerce. It should be appreciated that, in various embodiments hereof, the processor 135 is configured to cause the camera 130 to capture an image of the object in the object holder. The processor may be further configured to adjust a position of the camera, change a focus of the camera, change a resolution of the camera, and zoom a lens of the camera. In one embodiment, the processor performing the registration analysis in accordance with the teachings hereof is part of the camera. In another embodiment, the registration panel is also part of the camera comprising, for example, a lens or a transparent cover that fits over the lens and contains registration markings.

A "storage device", at 134 of FIG. 1, refers to a hard drive, memory, flash drive, USB device, and other volatile or non-volatile storage media, as is generally understood in the computing arts. Processor 135 is shown in communication with the storage device. The storage device contains marks and/or machine readable program instructions.

"Receive an image" is also intended to be widely construed and includes retrieving, capturing, acquiring, or otherwise obtaining images. The image can be received or retrieved from a remote device over a network, or from a media such as a CDROM or DVD. The image may be received directly from a memory or storage device of the camera used to capture that image.

"Registered" means that the object is positioned in the object holder so that when the object holder moves the object past the printhead, the mark to be printed on the object is properly placed and that the object comes within a pre-defined distance to the printhead (called the print zone). When the object is in the print zone, droplets of marking material ejected from the printhead form the mark on the object with a desired level of image quality as determined by a user, operator, or technician.

It should be appreciated that various operative steps such as: "receive", "retrieve", "perform", "determine", "cause", "analyze", communicate", "prevent", and the like, as used herein, include the application of any of a variety of techniques as well as mathematical operations according to any specific context or for any specific purpose. It should be appreciated that such steps may be facilitated or otherwise effectuated by a microprocessor executing machine readable program instructions such that the intended functionality is effectively performed.

Embodiments of Registration Panels

Figure 2:
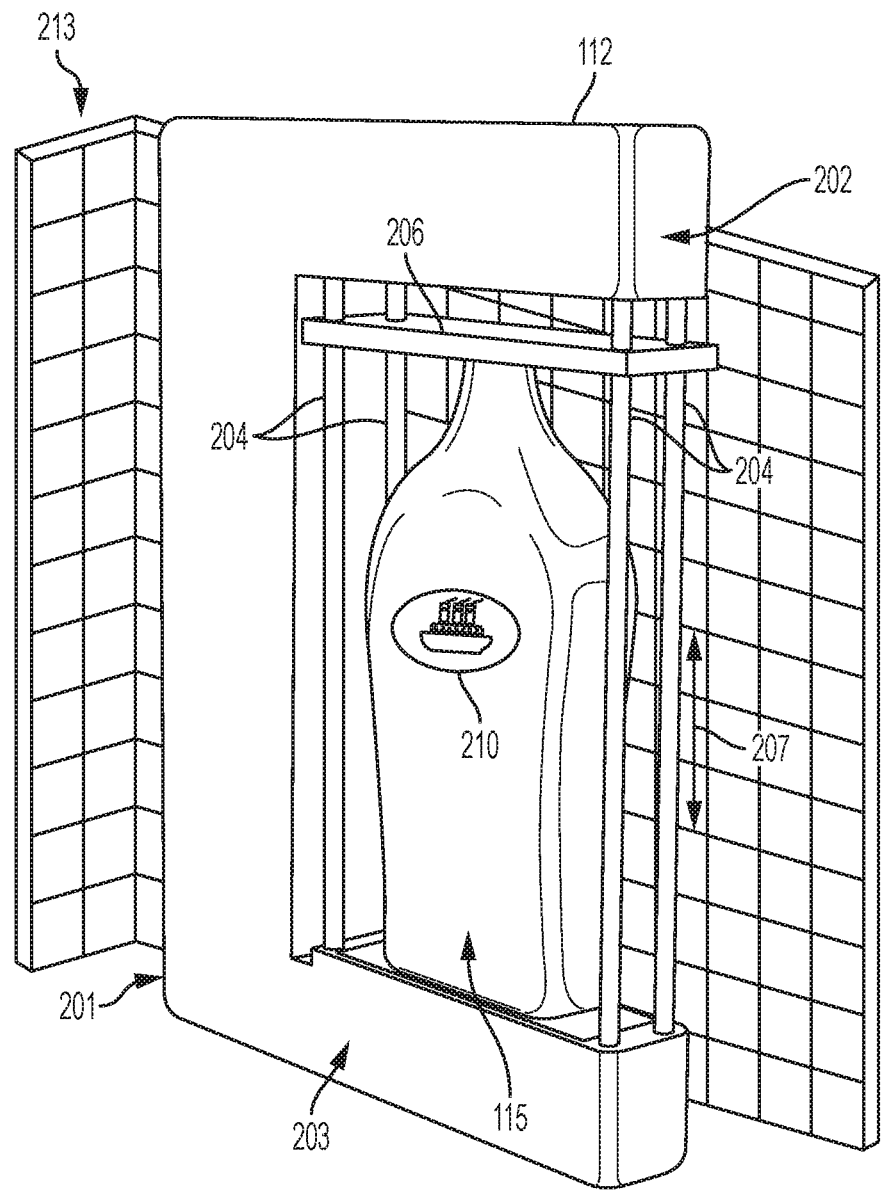
FIG. 2 shows one embodiment of an object holder retaining an object to be printed with one embodiment of a registration panel with registration markings comprising a grid of uniformly spaced lines.

Reference is now being made to FIG. 2 which shows one embodiment of an object holder retaining an object to be printed with one embodiment of a registration panel with registration markings comprising a grid of uniformly spaced lines. The object holder of FIG. 2 has a back support 201 configured to traverse the support member 106. A top arm 202 and bottom arm 203 are attached to the back support. The object holder is further configured with four support braces at 204A-D. Each brace is attached to the top and bottom arms 202 and 203, respectively. At least one restraining bar 206 is slideably attached to the support braces such that the bar can be raised or lowered (at 207) on to the object 115 seated between the top and bottom arms. The bar physically retains the object to the object holder. Elastomeric pads, or other material, on the bar and/or the bottom arm may be utilized to help support the object in the object holder. The registration panel 213 of FIG. 2 is a two-sided panel with a grid of uniformly spaced vertical and horizontal markings. At least one camera, such as camera 130 of FIG. 1, is used to capture images of the object holder and the registration panel.

Figure 3:
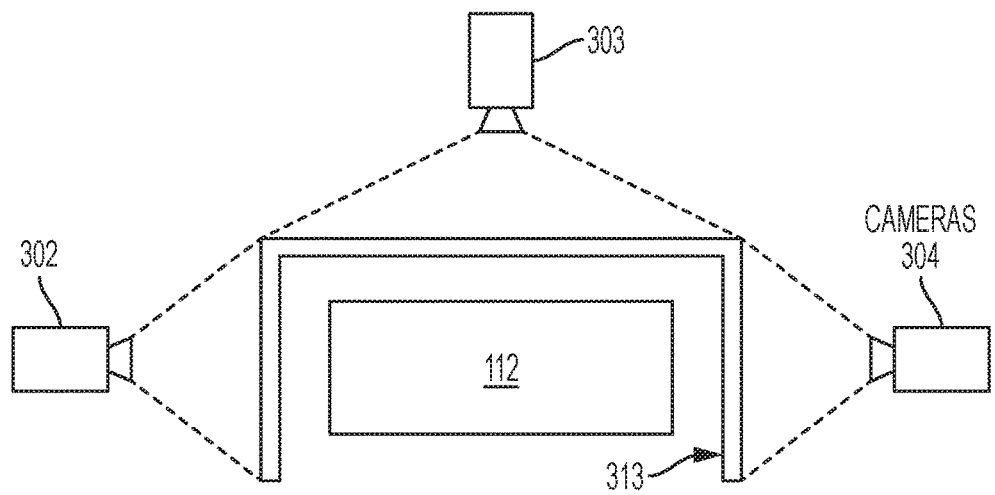
FIG. 3 shows a top view of one embodiment of a three-sided registration panel with a plurality of cameras each capturing an image of a different side of the object in the object holder of FIG. 2.

Reference is now being made to FIG. 3 which shows a top view of one embodiment of a three-sided registration panel with a plurality of cameras each capturing an image of a different side of the object in the object holder of FIG. 2. The three-sided registration panel 313 with registration markings (not shown) is placed around the object holder 112 of FIG. 2. Cameras 302, 303 and 304 are positioned to each capture images of a respective side of the object in the object holder through the transparent panel. The cameras of FIG. 3 can be positionally fixed or moveable.

Figure 4:
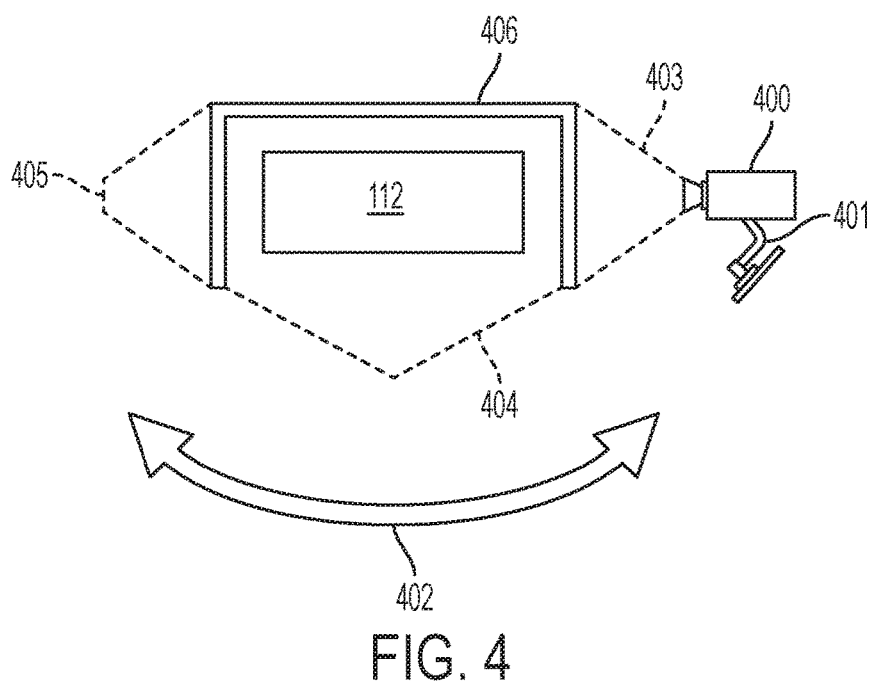
FIG. 4 shows one embodiment of the present registration system wherein the camera is moveable to capture images of the object in the object holder from different angles relative to the registration panel.

Reference is now being made to FIG. 4 which shows one embodiment of the present registration system wherein the camera is moveable to capture images of the object in the object holder from different angles relative to the registration panel. In the embodiment of FIG. 4, a single camera 400 is mounted on a slideable and axially rotatable robotic arm 401 capable of moving the camera along a semi-circular trajectory (at 402) from side-to-side such that images can be captured in a right-side view 403, a front view 404, and a left-side view 405, and various oblique angles therebetween. The left and right sides of the registration panel 406 are transparent so that the camera can capture images of the object through the panel.

Figure 5:
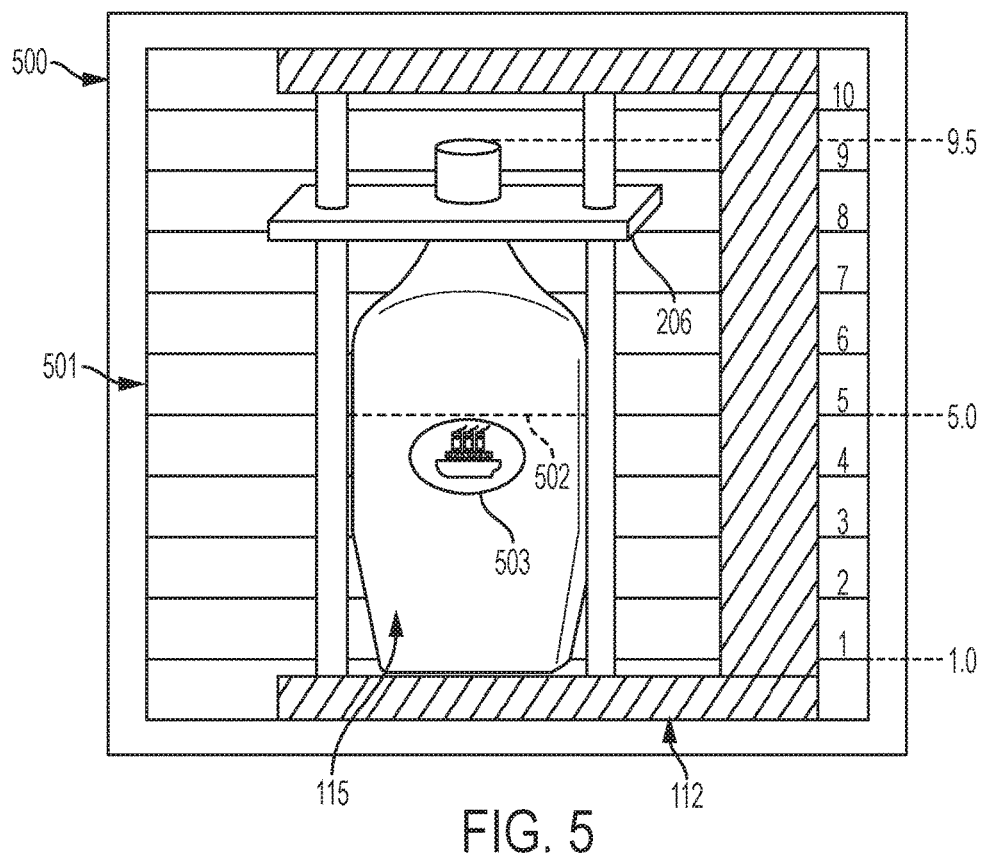
FIG. 5 shows an image of a registration panel positioned behind the object in the object holder of FIG. 2.

Reference is now being made to FIG. 5 which shows an image of a registration panel positioned behind the object in the object holder of FIG. 2. In FIG. 5, the example image 500 shows the object holder in front of a registration panel 501 with graduated, evenly-spaced registration markings. In this embodiment, the neck of the bottle extends through a hole in the restraining bar 206 to more securely retain the bottle for registration determination. The processor analyses the received image 500 and retrieves one or more registration locations for this particular object from a memory or storage device. The processor analyzes the image and the retrieved registration locations for this object relative to the numerical registration markings on the registration panel and determines that a top of the object is at 9.5, a logo on the bottle is at 5.0, and that a bottom of the bottle is at 1.0. By a comparison of the retrieved registration locations of the object 115 in the object holder 112 relative to the graduated horizontal markings of the registration panel 501, the process determines that the object is properly registered. If the object is registered in the object holder then the processor communicates to a controller to cause the object holder to move the object past the printhead. If the processor determines that the object is misregistered, i.e., not properly registered, then the processor prevents the object holder from moving the object to the printhead and communicates a notification to the user that the object is not properly registered. In one embodiment, the notification includes at least one the images of the object in the object holder and the registration panel such as the image 500 of FIG. 5.

Figure 6:
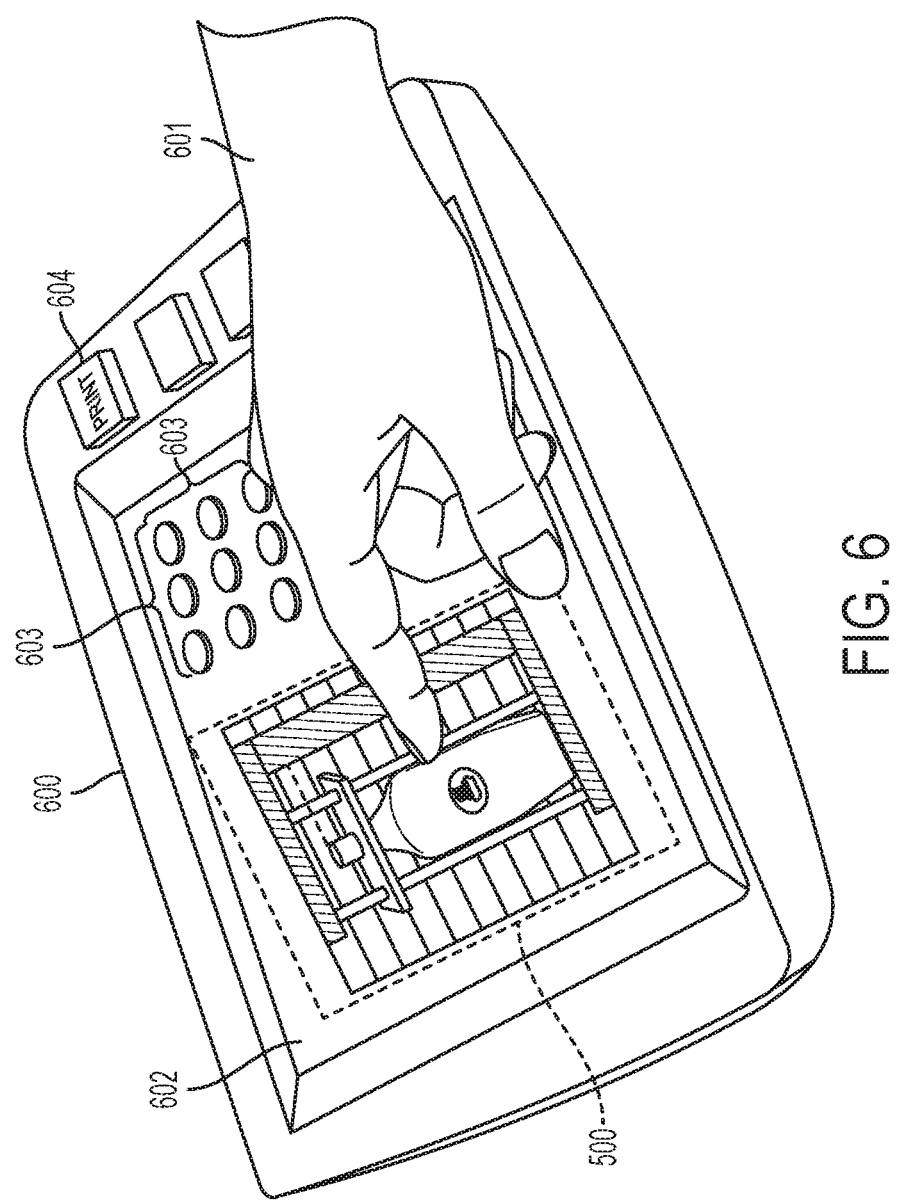
FIG. 6 shows the image of FIG. 5 displayed on a touchscreen of a user interface of a direct-to-object print system.

Reference is now being made to FIG. 6 shows the image 500 of FIG. 5 displayed on an embodiment of a user interface 600. The user 601 is shown viewing the displayed image. In various embodiments hereof, the user uses the functionality of the touchscreen display device 602 to make manual adjustments to a position of the bottle 115 in the displayed image so that the object will be properly printed when the object holder moves the object past the printheads. In another embodiment, in response to the misregistration being small enough to be corrected by a manual adjustment to the printhead, the processor communicates to a controller to adjust the printhead to compensate for the misregistration in advance of the object holder moving the object past the printhead. The user interface incorporates a plurality of selectable software objects (collectively as buttons 603) which enable a user to manipulate various aspects of the functionality of the direct-to-object print system such as, for instance, make adjustments to the printhead. Other functionality includes, for example, a software button which brings up a virtual keyboard on the touchscreen for a user to enter alphanumeric text which can be used as a mark. Another software button enables the user to enlarge the image as needed. Another button enables the user to retrieve another image from the camera or to control various aspects of the camera such as, for instance, adjust a position of the camera, change a focus of the camera, change a resolution of the camera, and zoom a lens of the camera. Still other buttons enable the user to configure various aspects of the direct-to-object print system such as the controller, actuator, printhead, to name a few aspects of the direct-to-object print system disclosed herein. It should be appreciated that a software object generally takes the form of a small pictogram to provide a user with a visual representation of the functionality which the software button executes when selected. Text, audio, and/or video may be associated with a button. When the user is finished with the registration process, the user would, for example, select the hardware button 604 which causes the processor signal the controller to cause the object holder to begin moving the object over to the printhead.

It should be appreciated that a touchscreen display can be configured by software to display a wide variety of graphical widgets such as, for instance, numeric and text windows, scroll bars, dials, slideable bars, buttons, charts, plots, graphs, images, and the like. The embodiment shown is illustrative and may include any other functionality which any touchscreen known in the art is capable of displaying. Software used to configure a particular device to display an image and accept a user input is often device-dependent and may be proprietary to a particular manufacturer. Therefore, a further discussion regarding specific software algorithms to program or otherwise configure a touchscreen is omitted herein. Those of ordinary skilled would program their user interface to display selectable menus to perform some or all of the functionality described herein.

Figure 7:
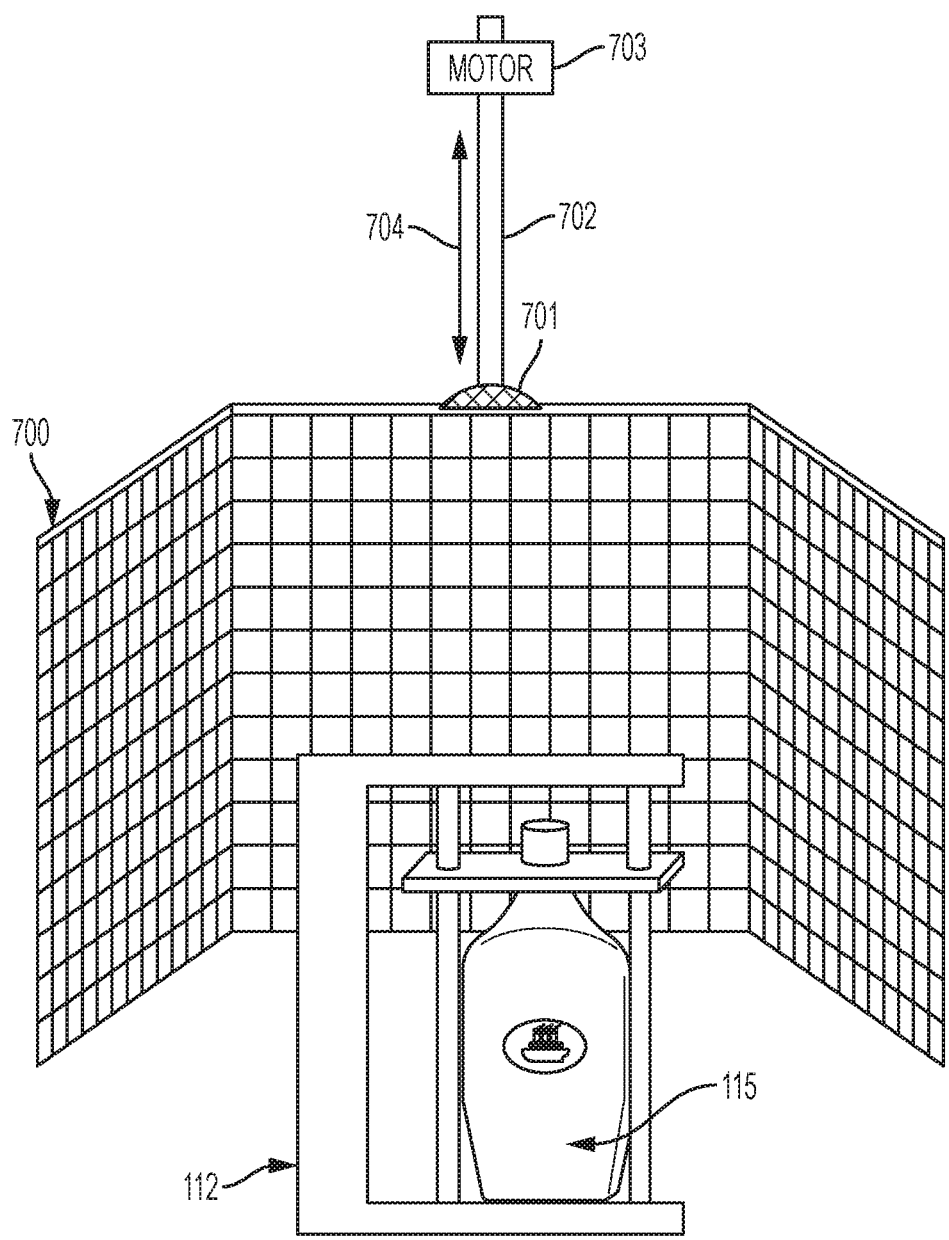
FIG. 7 shows another embodiment of the present registration system wherein the registration panel is moveable.

Reference is now being made to FIG. 7 which shows another embodiment of the present registration system wherein the registration panel is moveable and thus can be moved away from the object holder after the object is determined to be properly registered in the object holder in advance of the object holder moving the object past the printhead. In this embodiment, the three-sided registration panel 700 is slideably attached (at 701) to a shaft 702 connected to a motor 703 which, when instructed by a processor, lowers (at 704) the registration panel 700 down around the object holder 112 and, upon completion of the registration processes, proceeds to lift the registration panel up and away (at 704) so that the object holder can proceed to move the object past the printhead. In one embodiment, upon misregistration, the processor prevents the motor from lifting the registration panel.

It should be appreciated that the embodiments hereof are illustrative and are not intended to limit the scope of the appended claims strictly to the embodiments shown. Other configurations of registration panels and registration marks are intended to fall within the scope of the appended claims.
Embodiments of Direct-to-Object Print Systems What is also disclosed is a direct-to-object print system configured to use various embodiments of the registration system of the present invention.

Figure 8:
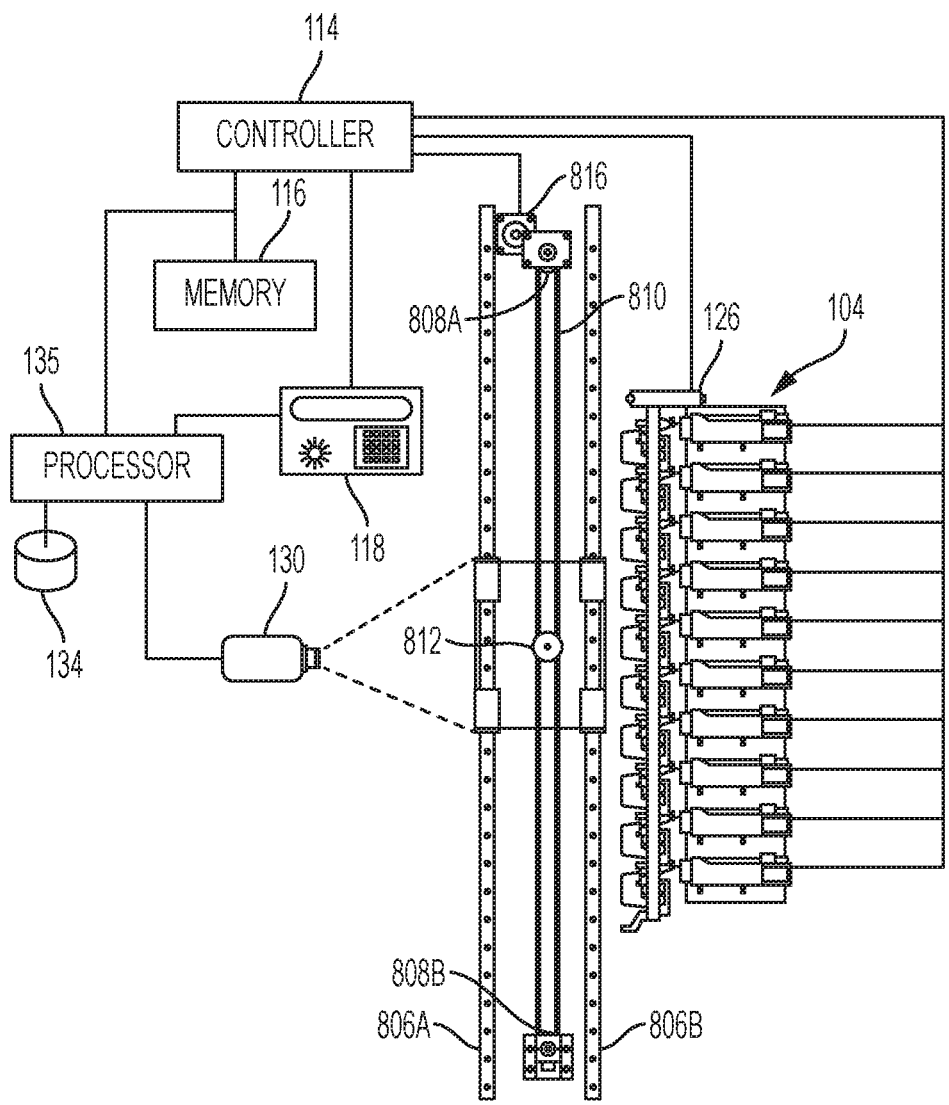
FIG. 8 shows an alternative embodiment of the direct-to-object print system of FIG. 1.

Reference is now being made to FIG. 8 which illustrates an alternative embodiment to the direct-to-object print system of FIG. 1 which uses a belt to move the object holder past the printheads. The support member comprises a pair of support members 806A and 806B about which the object holder 112 is slideably attached. A pair of fixedly positioned pulleys 808A and 808B and a belt 810 form an endless belt entrained about the pair of pulleys, and a rotatable pulley 812 engages the endless belt to enable the third pulley to rotate in response to the movement of the endless belt moving about the pair of pulleys to move the object holder disclosed herein. The actuator 816 operatively rotates the drive pulley to move the endless belt about the pulleys. The controller 114 is configured to operate the actuator. The object holder of FIG. 1 has been omitted to show underlying components.

Figure 9:
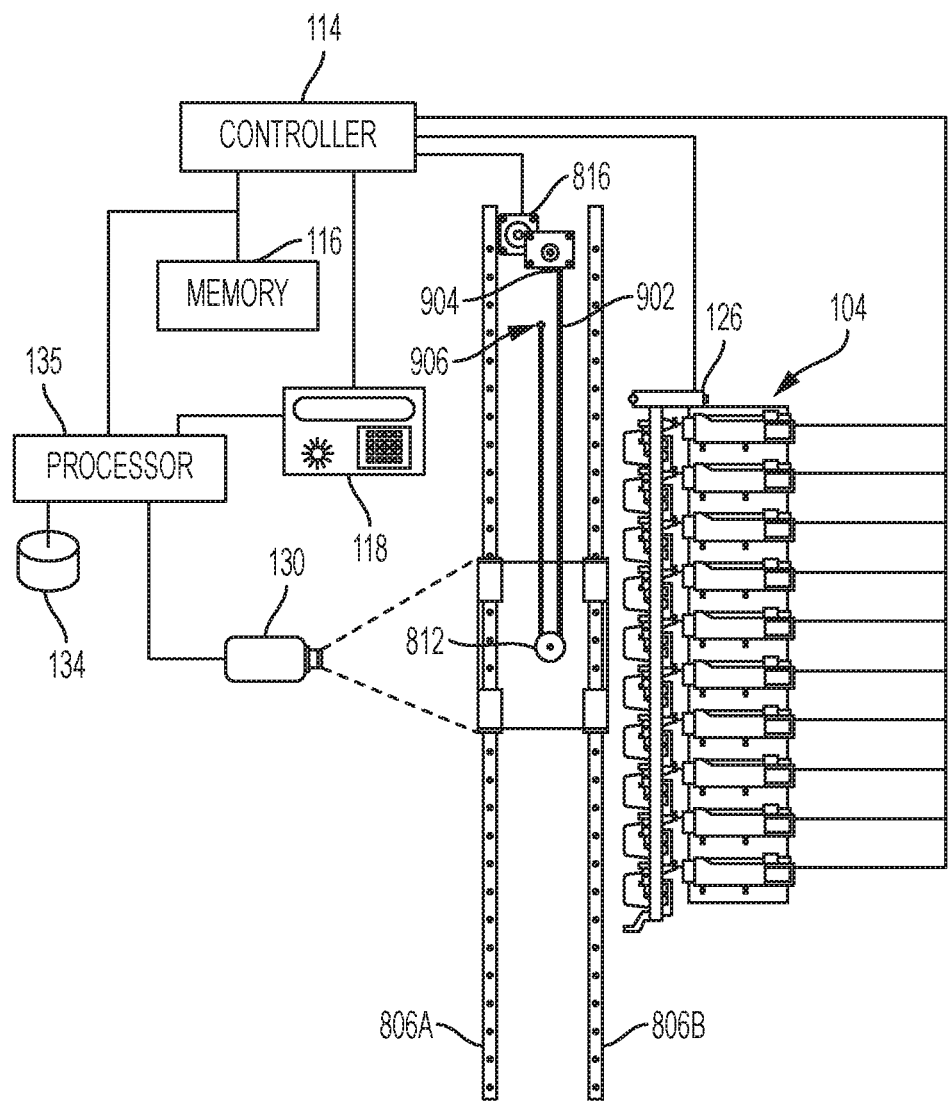
FIG. 9 shows another alternative embodiment of the direct-to-object print system of FIG. 1.

Reference is now being made to FIG. 9 which illustrates yet another embodiment of the direct-to-object print system of FIG. 1. One end of a belt 902 is operatively connected to a take-up reel 904 that is operatively connected to the actuator 816. The other end of the belt is positionally fixed at 906. The belt also engages a rotatable pulley 812 attached to the object holder. The support member comprises a pair of support members 806A and 806B about which the object holder 112 is slideably attached. The actuator rotates the take-up reel to wind a portion of the length of the belt about the take-up reel to cause the object holder to move past the printheads. The actuator unwinds the belt from the take-up reel. The controller 114 is configured to operate the actuator. The object holder of FIG. 1 has been omitted to show underlying components.

Figure 10:
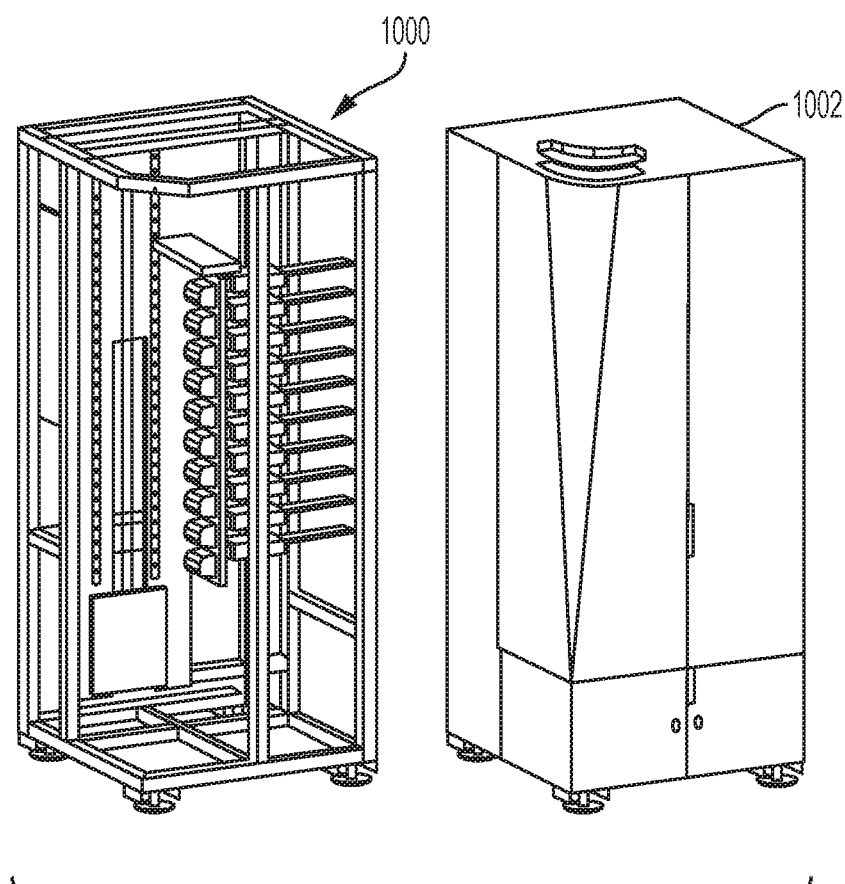
FIG. 10 show one embodiment of the present direct-to-object print system housed in a cabinet.

Reference is now being made to FIG. 10 which shows an embodiment of the present direct-to-object print system 1000 housed in a cabinet 1002. The object holder is omitted.

The direct-to-object print system disclosed herein can be placed in communication with a workstation, as are generally understood in the computing arts. Such a workstation has a computer case which houses various components such as a motherboard with a processor and memory, a network card, a video card, a hard drive capable of reading/writing to machine readable media such as a floppy disk, optical disk, CD-ROM, DVD, magnetic tape, and the like, and other software and hardware needed to perform the functionality of a computer workstation. The workstation further includes a display device, such as a CRT, LCD, or touchscreen device, for displaying information, images, classifications, computed values, extracted vessels, patient medical information, results, interim values, and the like. A user can view any of that information and make a selection from menu options displayed thereon. The workstation has an operating system and other specialized software configured to display alphanumeric values, menus, scroll bars, dials, slideable bars, pull-down options, selectable buttons, and the like, for entering, selecting, modifying, and accepting information needed for processing in accordance with the teachings hereof. The workstation can display images and information about the operations of the present direct-to-object print system. A user or technician can use a user interface of the workstation to set parameters, view/adjust/delete values, and adjust various aspects of various operational components of the present direct-to-object print system, as needed or desired, depending on the implementation. These selections or inputs may be stored to a storage device. Settings can be retrieved from the storage device. The workstation can be a laptop, mainframe, or a special purpose computer such as an ASIC, circuit, or the like.

Any of the components of the workstation may be placed in communication with any of the modules and processing units of the direct-to-object print system and any of the operational components of the present direct-to-object print system can be placed in communication with storage devices and computer readable media and may store/retrieve therefrom data, variables, records, parameters, functions, and/or machine readable/executable program instructions, as needed to perform their intended functions. The various components of the present direct-to-object print system may be placed in communication with one or more remote devices over network via a wired or wireless protocol. It should be appreciated that some or all of the functionality performed by any of the components of the direct-to-object print system can be controlled, in whole or in part, by the workstation.

The teachings hereof can be implemented in hardware or software using any known or later developed systems, structures, devices, and/or software by those skilled in the applicable art without undue experimentation from the functional description provided herein with a general knowledge of the relevant arts. One or more aspects of the systems disclosed herein may be incorporated in an article of manufacture which may be shipped, sold, leased, or otherwise provided separately either alone or as part of a product suite or a service. The above-disclosed and other features and functions, or alternatives thereof, may be desirably combined into other different systems or applications.

Presently unforeseen or unanticipated alternatives, modifications, variations, or improvements may become apparent and/or subsequently made by those skilled in this art which are also intended to be encompassed by the following claims.

What is claimed is:

1. A registration system for registering an object in a direct-to-object print system, the registration system comprising:
    a registration panel with a plurality of registration markings placed near an object held in an object holder configured to slideably traverse a support member positioned parallel to a plane formed by at least one printhead of a direct-to-object print system;
    at least one camera positioned to capture an image of both the object in the object holder and the registration panel; and
    a processor executing machine readable instructions which configure the processor to:
        receive, from the camera, at least one image of both the object in the object holder and the registration panel;
        analyze the received image to determine a position of the object relative to the markings on the registration panel;
        determine, based on the position of the object in the object holder, whether the object is registered; and
        in response to the object being registered in the object holder, communicate to a controller to cause the object holder to move the object past the printhead for printing, otherwise prevent the object holder from moving the object.

2. The registration system of claim 1, wherein the processor is further configured to perform any of: adjust a position of the camera, change a focus of the camera, change a resolution of the camera, zoom a lens of the camera, and cause the camera to capture an image.

3. The registration system of claim 1, wherein the registration panel is transparent, the camera capturing an image of the object through the transparent panel.

4. The registration system of claim 1, wherein the registration panel is moveable and thus can be moved away from the object holder after the object is determined to be properly registered in the object holder and in advance of the object holder moving the object past the printhead.

5. The registration system of claim 1, further comprising a plurality of cameras each capturing an image of a side of the object in the object holder and the registration panel.

6. The registration system of claim 1, wherein the camera is mounted on a moveable arm to capture image of the object in the object holder from different angles.

7. The registration system of claim 1, wherein the registration panel is part of the camera.

8. The registration system of claim 1, wherein the processor is part of the camera.

9. The registration system of claim 1, further comprising an actuator for operatively causing the object holder to slideably traverse the support member, the controller being configured to cause the actuator to move the object holder past the printhead.

10. The registration system of claim 1, further comprising an actuator for operatively causing the object holder to slideably traverse the support member, the controller being configured to cause the actuator to move the object holder past the printhead.

11. The registration system of claim 1, wherein, in response to the misregistration being small enough to be corrected by an adjustment to the printhead, the processor further being configured to communicate to a controller to adjust the printhead to compensate for the misregistration in advance of the object holder moving the object past the printhead.

12. The registration system of claim 1, wherein in addition to preventing the object holder from moving the object, the processor further communicating a notification to a user interface that the object in the object holder is not registered.

13. The registration system of claim 12, wherein the notification includes at least one of the received images.

14. A direct-to-object print system for printing on a surface of an object, comprising:
    at least one printhead configured to eject marking material on to a surface of an object;
    an object holder configured to slideably traverse a support member positioned to be parallel to a plane formed by the printhead, the object holder physically retaining the object while it is being moved;
    a registration panel with a plurality of registration markings;
    at least one camera positioned to capture an image of both the object in the object holder and the registration panel; and
    a processor executing machine readable instructions which configure the processor to:
        receive, from the camera, at least one image of both the object in the object holder and the registration panel;
        analyze the received image to determine a position of the object relative to the markings on the registration panel;
        determine, based on the position of the object in the object holder, whether the object is registered; and
        in response to the object being registered in the object holder, communicate to a controller to cause the object holder to move the object past the printhead for printing, otherwise prevent the object holder from moving the object.

15. The direct-to-object print system of claim 14, wherein the registration panel is transparent, the camera capturing an image of the object through the transparent panel.

16. The direct-to-object print system of claim 14, wherein the registration panel is moveable and thus can be moved away from the object holder after the object is determined to be properly registered in the object holder and in advance of the object holder moving the object past the printhead.

17. The direct-to-object print system of claim 14, further comprising a plurality of cameras each capturing an image of a side of the object in the object holder and the registration panel.

18. The direct-to-object print system of claim 14, wherein the camera is mounted on a moveable arm to capture image of the object in the object holder from different angles.

19. The direct-to-object print system of claim 14, wherein the registration panel is part of the camera.

20. The direct-to-object print system of claim 14, wherein the processor is part of the camera.

21. The direct-to-object print system of claim 14, further comprising an actuator for operatively causing the object holder to slideably traverse the support member, the controller being configured to cause the actuator to move the object holder past the printhead.

22. The direct-to-object print system of claim 21, further comprising a belt that contacts pulleys, one of the pulleys being operatively connected to the actuator which causes the pulley to move the belt about the pulleys and move the object holder past the printhead.

23. The direct-to-object print system of claim 14, wherein the support member is oriented to enable one end of the support member to be at a higher gravitational potential than another end of the support member.

24. The direct-to-object print system of claim 14, wherein, in response to the misregistration being small enough to be corrected by an adjustment to the printhead, the processor further being configured to communicate to a controller to adjust the printhead to compensate for the misregistration in advance of the object holder moving the object past the printhead.

25. The direct-to-object print system of claim 14, wherein in addition to preventing the object holder from moving the object, the processor further communicating a notification to a user interface that the object in the object holder is not registered.

26. The direct-to-object print system of claim 25, wherein the notification includes at least one of the received images.

27. The direct-to-object print system of claim 14, further comprising an identification tag and an input device.

28. The direct-to-object print system of claim 27, wherein the identification tag comprises any of: a RFID tag containing an identifier and the input device is a RFID reader, a barcode containing an identifier and the input device is a barcode reader, and at least one mechanical feature and the input device is a biased arm that follows the mechanical features and converts a position of the arm into an electrical signal comprising an identifier.

29. The direct-to-object print system of claim 27, wherein the controller is further configured to:
 receive the identifier from the input device;
 compare the identifier to at least one identifier stored in a memory; and
 disable the actuator in response to the identifier failing to correspond to any of the identifiers stored in memory.

30. The direct-to-object print system of claim 27, wherein the controller is further configured to:
 receive the identifier from the input device;
 compare the identifier to identifiers stored in a memory; and
 disable operation of the printhead in response to the identifier failing to correspond to any of the identifiers stored in memory.

31. The direct-to-object print system of claim 14, wherein the controller is further configured to:
 detect a configuration of the printhead and ink supplied to the printhead; and
 communicate a message to the user interface, the message being any of: that ink needs to be changed, and that the printhead needs to be reconfigured.

32. The direct-to-object print system of claim 14, further comprising a sensor positioned to capture image data from one of: the object holder, the object, and a sheet of printed media, the controller being configured to receive the image data from the sensor and analyze the image data to identify any of: printhead alignment, image quality, and inoperative ejectors.

33. The direct-to-object print system of claim 22, wherein the belt is entrained about the pulleys to form an endless belt, further comprising an additional pulley that engages the endless belt to enable the additional pulley to rotate in response to a movement of the endless belt to move the object holder.

* * * * *